US010819533B2

(12) United States Patent
Merkh et al.

(10) Patent No.: US 10,819,533 B2
(45) Date of Patent: *Oct. 27, 2020

(54) COMMUNICATION NETWORKS FOR PAYMENT, OPERATION, AND CONTROL OF APPLIANCES, AND METHODS OF USING THE SAME

(71) Applicant: TNBI, Inc., Wilmington, DE (US)

(72) Inventors: Thomas G. Merkh, Westmont, NJ (US); Charles J. Pasquale, Jr., Malvern, PA (US); Robert J. Kniskern, Fort Wayne, IN (US)

(73) Assignee: TNBI, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/712,455

(22) Filed: Sep. 22, 2017

(65) Prior Publication Data

US 2018/0091325 A1   Mar. 29, 2018

Related U.S. Application Data

(60) Provisional application No. 62/398,826, filed on Sep. 23, 2016.

(51) Int. Cl.
*H04L 12/28* (2006.01)
*G06Q 20/38* (2012.01)
*G06Q 20/32* (2012.01)
*H04L 12/413* (2006.01)
*G06Q 20/18* (2012.01)

(52) U.S. Cl.
CPC ......... *H04L 12/2803* (2013.01); *G06Q 20/18* (2013.01); *G06Q 20/325* (2013.01); *G06Q 20/382* (2013.01); *H04L 12/413* (2013.01); *H04L 2012/285* (2013.01)

(58) Field of Classification Search
CPC ............... H04L 12/2803; H04L 12/413; H04L 2012/285; H04L 12/40104; G06Q 20/18; G06Q 20/325; G06Q 20/382; G06Q 20/38215; G07F 17/20
USPC ....................................................... 340/12.22
See application file for complete search history.

(56) References Cited

U.S. PATENT DOCUMENTS 6,167,387 A * 12/2000 Lee-Wai-Yin ......... G06Q 20/10
                                                      235/379
2005/0108326 A1    5/2005 Tuttle
2006/0122715 A1 * 6/2006 Schroeder ............... D06F 33/02
                                                      700/65

(Continued)

OTHER PUBLICATIONS

International Search Report for International Patent Application No. PCT/US2017/052962 dated Jan. 11, 2018.

*Primary Examiner* — Edwin C Holloway, III
(74) *Attorney, Agent, or Firm* — Stradley Ronon Stevens & Young, LLP

(57) ABSTRACT

A communication network for appliances is provided. The communication network includes: (a) a plurality of local communication devices, each of the plurality of local communication devices transmitting data related to at least one of (i) a user of an appliance, and (ii) an appliance; and (b) a communication hub receiving data transmissions from each of the plurality of local communication devices, wherein communications between the plurality of local communication devices and the communication hub are encrypted.

29 Claims, 12 Drawing Sheets

(56) References Cited

U.S. PATENT DOCUMENTS

| | | | |
|---|---|---|---|
| 2007/0217414 A1* | 9/2007 | Berkman | H04B 3/231 |
| | | | 370/390 |
| 2011/0010279 A1* | 1/2011 | Tuttle | G06Q 10/06 |
| | | | 705/30 |
| 2011/0202413 A1* | 8/2011 | Stewart | G06Q 20/10 |
| | | | 705/16 |
| 2011/0202910 A1* | 8/2011 | Venkatakrishnan | G06Q 10/06 |
| | | | 717/171 |
| 2011/0248821 A1* | 10/2011 | Merten | H04Q 9/00 |
| | | | 340/5.74 |
| 2013/0073690 A1* | 3/2013 | DeSalvo | H04L 67/125 |
| | | | 709/219 |
| 2017/0082991 A1* | 3/2017 | Belveal | G05B 15/02 |
| 2017/0171090 A1* | 6/2017 | Britt | H04L 47/2425 |
| 2017/0171204 A1* | 6/2017 | Forood | H04W 4/70 |
| 2018/0089653 A1* | 3/2018 | Merkh | G06Q 20/18 |
| 2018/0089673 A1* | 3/2018 | Merkh | D06F 31/00 |

\* cited by examiner

COMMUNICATION NETWORKS FOR PAYMENT, OPERATION, AND CONTROL OF APPLIANCES, AND METHODS OF USING THE SAME

CROSS-REFERENCE TO RELATED APPLICATION

This application claims the benefit of U.S. Provisional Patent Application No. 62/398,826, filed Sep. 23, 2016, the contents of which are incorporated herein by reference.

FIELD

The invention relates to the field of appliances such as laundry appliances, and more particularly, to improved communication networks for payment, operation and control of such appliances.

SUMMARY

According to an exemplary embodiment of the invention, a communication network for appliances is provided. The communication network includes: (a) a plurality of local communication devices, each of the plurality of local communication devices transmitting data related to at least one of (i) a user of an appliance, and (ii) an appliance; and (b) a communication hub receiving data transmissions from each of the plurality of local communication devices, wherein communications between the plurality of local communication devices and the communication hub are encrypted.

According to another exemplary embodiment of the invention, a method of operating a communication network for appliances is provided. The method includes the steps of: (a) providing a plurality of local communication devices, each of the plurality of local communication devices being attached to a corresponding one of a plurality of appliances; and (b) transmitting data from each of the plurality of local communication devices to a communication hub, the data being transmitted from each of the plurality of local communication devices being related to at least one of (i) a user of at least one of the plurality of appliances, and (ii) at least one of the plurality of appliances, wherein step (b) includes encrypting communications between the plurality of local communication devices and the communication hub prior to transmission.

According to an exemplary embodiment of the invention, a communication network for appliances is provided. The communication network includes: (a) a plurality of local communication devices, each of the plurality of local communication devices transmitting data related to at least one of (i) a user of an appliance, and (ii) an appliance; (b) a communication hub receiving data transmissions from each of the plurality of local communication devices; and (c) a computer configured to communicate with the communication hub, and configured to retrieve data related to at least one of (i) the user of the appliance, and (ii) the appliance, wherein communications between the computer and each of the (i) the plurality of local communication devices, and (ii) the communication hub, are encrypted.

According to another exemplary embodiment of the invention, a method of operating a communication network for appliances is provided. The method includes the steps of: (a) providing a plurality of local communication devices, each of the plurality of local communication devices being attached to a corresponding one of a plurality of appliances; and (b) transmitting data from each of the plurality of local communication devices to a communication hub, the data being transmitted from each of the plurality of local communication devices being related to at least one of (i) a user of at least one of the plurality of appliances, and (ii) at least one of the plurality of appliances; (c) transmitting data between the communication hub and a computer, the data being transmitted between the communication hub and the computer being related to at least one of (i) a user of at least one of the plurality of appliances, and (ii) at least one of the plurality of appliances, wherein step (c) includes encrypting communications between the communication hub and the computer prior to transmission.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

Figure 1A:
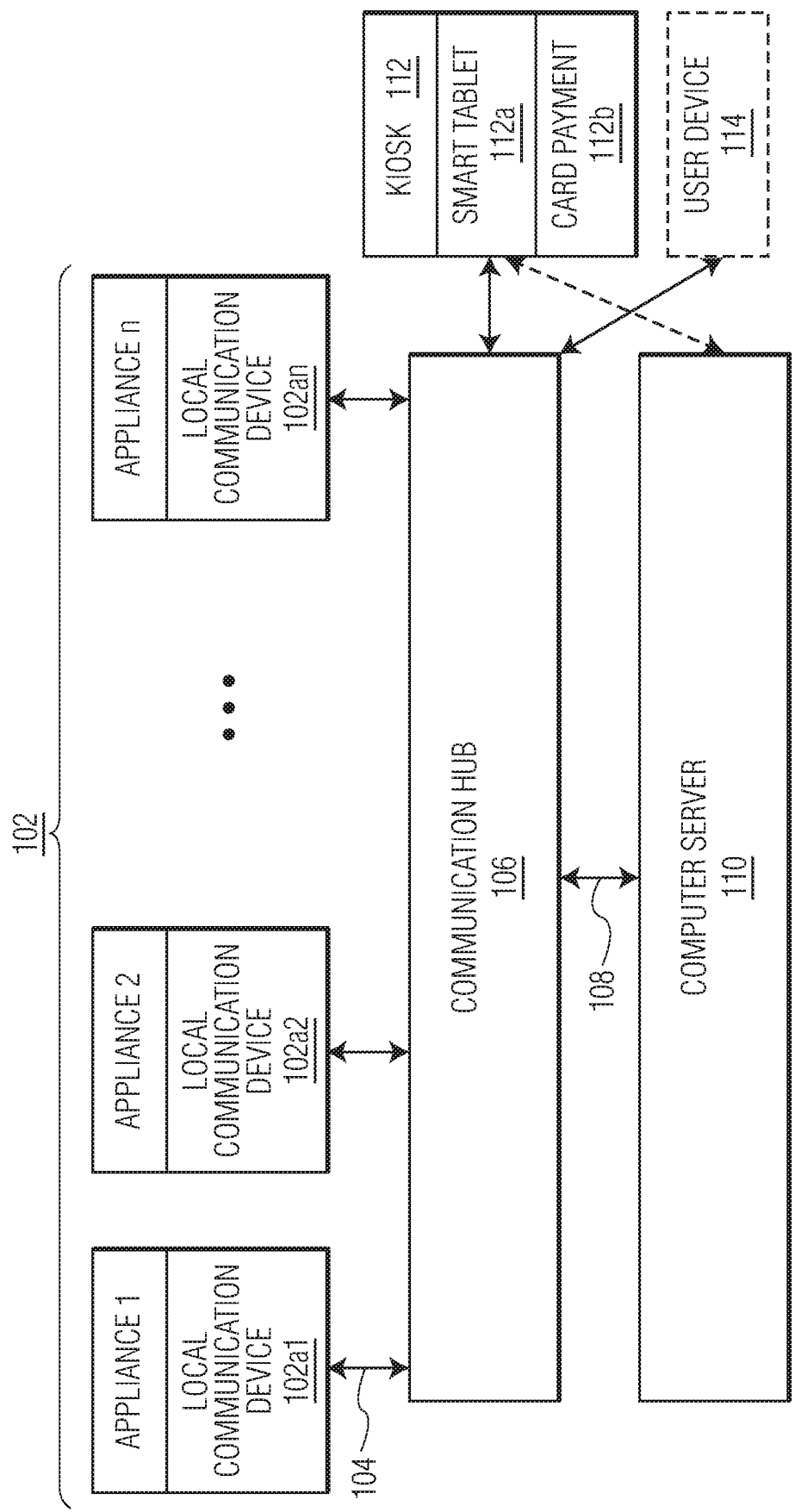
FIG. 1A is a block diagram of a communication network for appliances in accordance with an exemplary embodiment of the invention.

FIG. 1A illustrates a communication network 100 for appliances 102 (e.g., washers, dryers, etc.). In FIG. 1A, the appliances 102 are labelled as "Appliance 1", "Appliance 2", ..., and "Appliance n". For example, the appliances 102 (as well as the local communication devices 102, the communication hub 106, and the kiosk 112) may be provided in a laundromat environment (e.g., a laundry area). Other example laundry areas for operation of communication network 100 include an apartment complex (e.g., in a common laundry are), a dormitory at a university, amongst others.

Each of the appliances 102 includes a corresponding local communication device 102$a$1, 102$a$2, ..., 102$an$ (where an example local communication device is described below as a machine interface board, also referred to as a MIB module or a MIB). Each local communication device 102$a$1, 102a2, . . . , 102an is configured to transmit data related to at least one of (i) a user of an appliance 102, and (ii) an appliance 102 to a communication hub 106. Example data related to the user of the appliance includes at least one of (i) information identifying the user, (ii) an account identifier of the user, (iii) instructions from the user for operation of the appliance, and (iv) an account balance of the user. Example data related to the appliance includes at least one of (i) information identifying the appliance, (ii) an operational status of the appliance, (iii) instructions from the user for operation of the appliance, and (iv) an alarm condition of the appliance.

The communication hub 106 receives data transmissions from each of the plurality of local communication devices 102a1, 102a2, . . . , 102an, and sends data transmissions to each of the plurality of local communication devices 102a1, 102a2, . . . , 102an. Communications between the plurality of local communication devices 102a1, 102a2, . . . , 102an and the communication hub 106 are radio frequency transmissions 104. Radio frequency transmissions 104 are at a frequency below 1 GHz (e.g., nominally 900 MHz, 915 MHz, approximately 900 MHz, approximately 800 MHz, approximately 400 MHz, etc.). As will be appreciated by those skilled in the art, the frequency may be dependent on the geographic location, among other factors. By providing radio frequency transmissions at such frequencies, reliable, short communications are enabled at a relatively close range (e.g., within the footprint of a laundromat).

Data transmissions 108 are transmitted back and forth between communication hub 106 and computer server 110. Such data transmissions 108 may be configured in a number of ways. For example, in FIG. 1A, a direct connection (e.g., a LAN connection, a WAN connection, etc.) is established between communication hub 106 and computer server 110. That is, computer server 110 may be local to the appliances (e.g., in the laundromat, in the apartment complex, in the dormitory area, etc.).

Figure 1B:
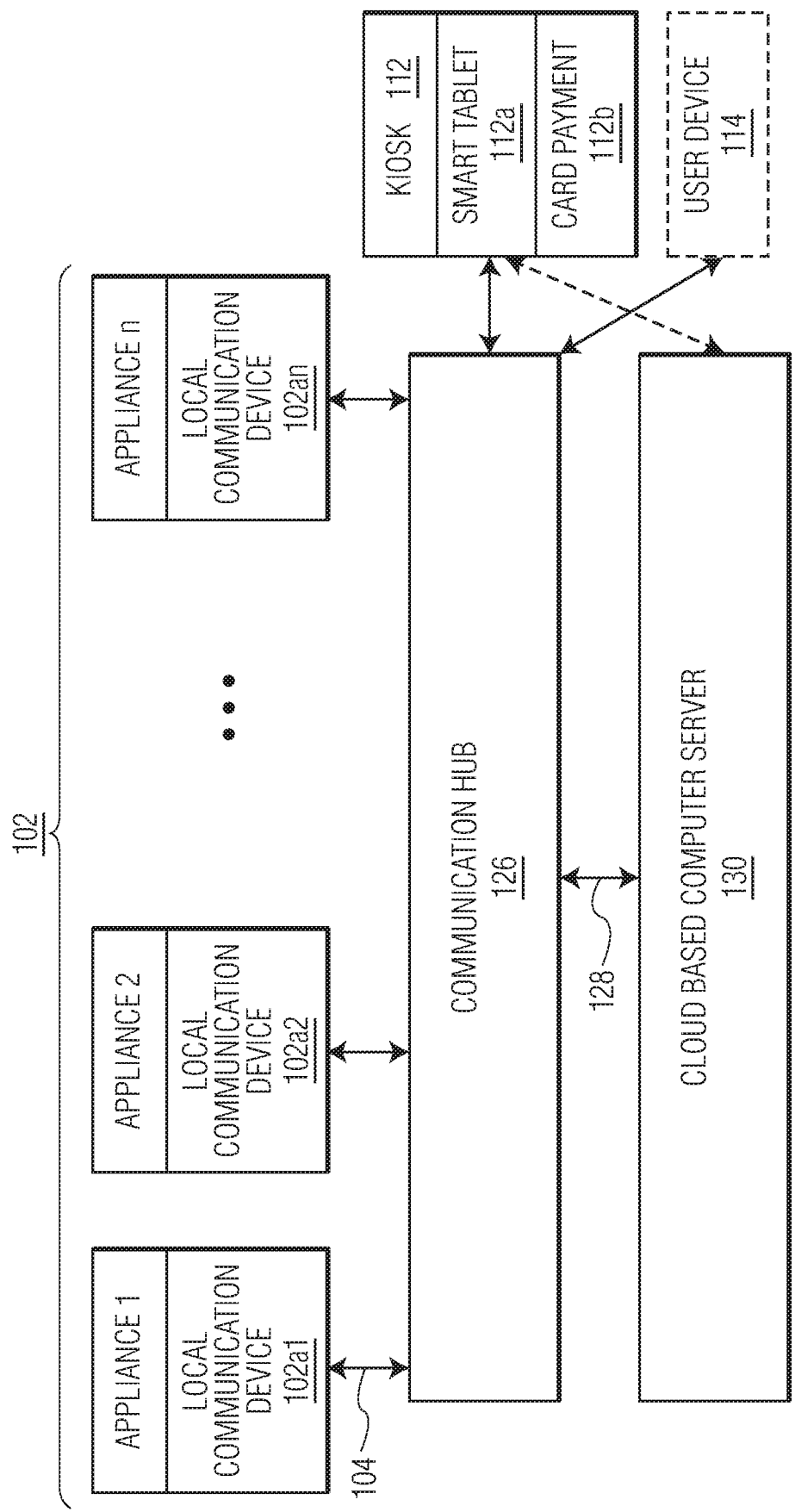
FIG. 1B is a block diagram of another communication network for appliances in accordance with another exemplary embodiment of the invention.

In FIG. 1B, appliances 102 (including local communication devices 102a1, 102a2, . . . , 102 an) in communication network 120, and the radio frequency transmissions 104, are the same (or substantially the same) as described above with respect to FIG. 1A. The bidirectional radio frequency transmissions 104 are provided from (and to) a communication hub 126. Communication hub 126 sends internet based transmissions 128 to cloud based computer server 130. Of course, communication hub 126 may also be configured to receive such transmissions 128 from cloud based computer server 130. The internet connection accessible by communication hub 126 may be an ethernet connection, a wifi connection, a cellular modem connection, etc.

Figure 1C:
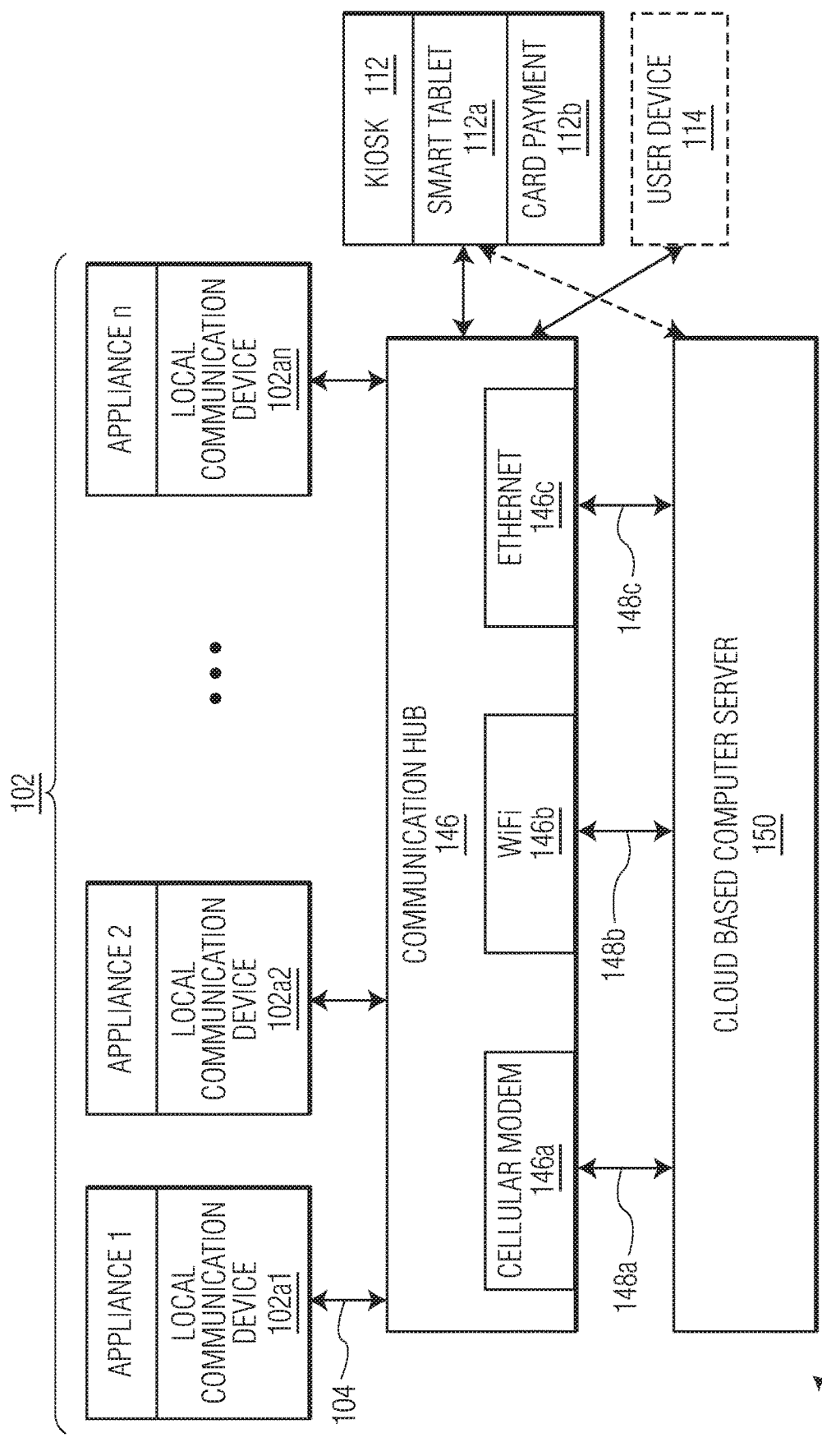
FIG. 1C is a block diagram of yet another communication network for appliances in accordance with another exemplary embodiment of the invention.

In accordance with certain aspects of the invention, it is desirable to have multiple different internet connections accessible by a communication hub 126. FIG. 1C is an example of such a configuration. In FIG. 1C, appliances 102 (including local communication devices 102a1, 102a2, . . . , 102 an) in communication network 140, and the radio frequency transmissions 104, are the same (or substantially the same) as described above with respect to FIG. 1A. The bidirectional radio frequency transmissions 104 are provided from (and to) a communication hub 146. Communication hub 146 sends internet based transmissions 148a, 148b, and 148c to cloud based computer server 150 using one (or more) of cellular modem internet connection 146a, wifi internet connection 146b, and ethernet internet connection 146c. Of course, communication hub 126 may also be configured to receive such transmissions 148a, 148b, 148c from cloud based computer server 150. Further, different types of internet connections are contemplated. The various internet connections between communication hub 146 may be managed in any of a number of ways, for example, to provide redundant connections, back-up connections, load sharing, etc.

Figure 2:
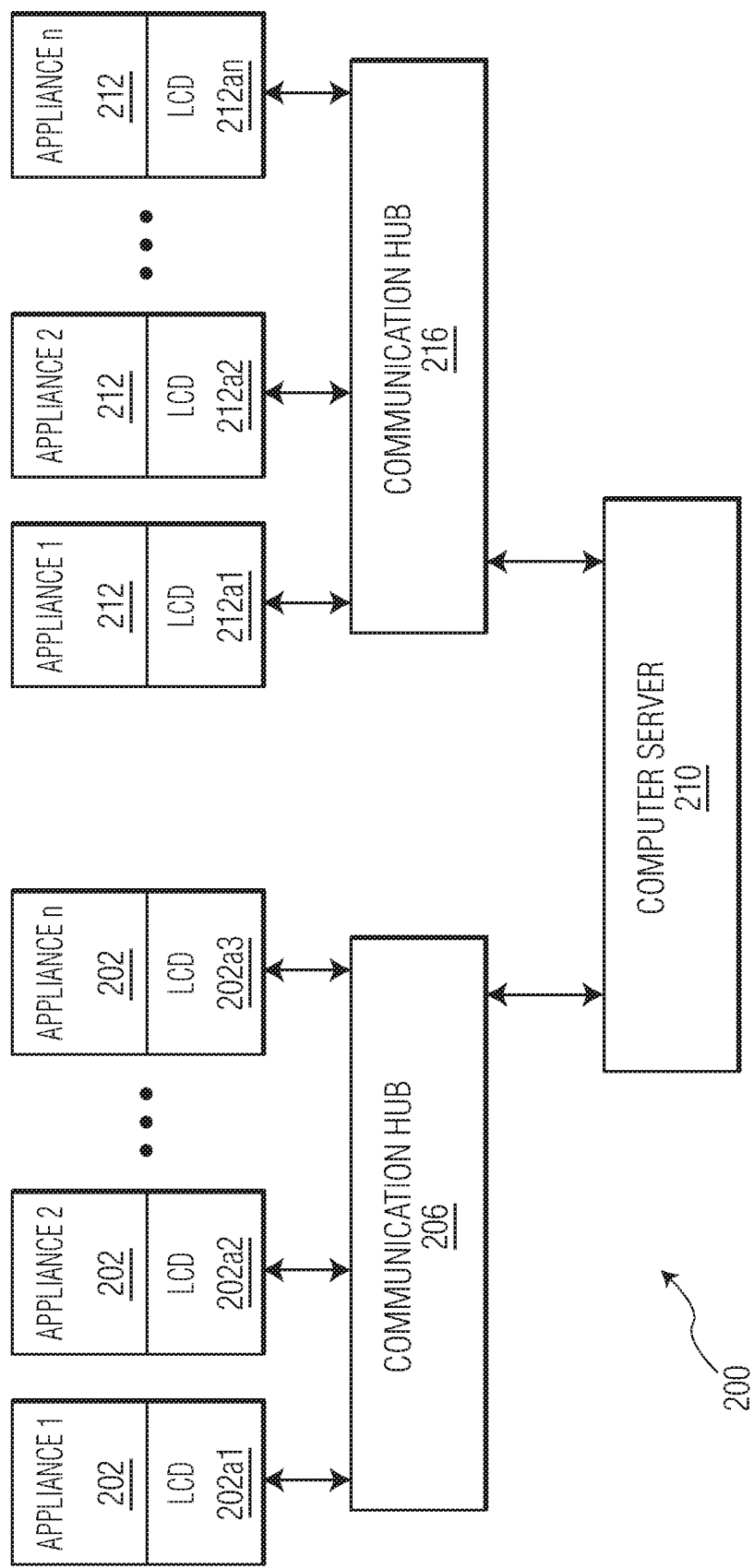
FIG. 2 is a block diagram of yet another communication network for appliances in accordance with another exemplary embodiment of the invention.

It will be appreciated that more than one communication hub (or more than one computer server) may be utilized in connection with an inventive communication network. For example, in an environment with many appliances, a first portion of the appliances may communicate with a first communication hub at a frequency below 1 GHz, a second portion of the appliances may communicate with a second communication hub at a frequency below 1 GHz, etc. FIG. 2 illustrates an example of such a communication network 200. In FIG. 2, a first group of appliances 202 (including local communication devices 202a1, 202a2, . . . , 202 an) exchange data transmissions with communication hub 206, while a second group of appliances 212 (including local communication devices 212a1, 212a2, . . . , 212an) exchange data transmissions with communication hub 216. Each communication hub 206, 216 exchanges transmissions with computer server 210. The connectivity (and related communications) between communication hubs 206, 216 and computer server 210 may be similar to the corresponding connectivity described in connections with any of FIGS. 1A-1C.

As shown in each of FIGS. 1A-1C, a kiosk 112 or the like may be provided for a user to operate at least one of the appliances. The exemplary kiosk 112 shown in FIGS. 1A-1C includes a smart tablet 112a in wireless communication with communication hub 106 (e.g., where the kiosk 112 acts as a user interface). The kiosk 112 also includes a card payment system 112b for providing payment for services ordered by the user via the kiosk 112. As made clear in each of FIGS. 1A-1C, communications may be provided directly between kiosk 112 (including any part of kiosk 112 including smart tablet 112a and card payment system 112b) and each of computer servers 110/130/150 (as opposed to communications from kiosk 112 to communications hub 106/126/146, and then to respective computer server 110/130/150).

The function of such a kiosk (e.g., a user interface to operate, and pay for operation of, one or more of the appliances) may also be provided (instead of, or in addition to, the kiosk) via a user device including an appropriate software application for interacting with the communication hub 106/126/146 (or directly with the respective server 110/130/150) regarding operation of the appliances. Examples of such a user device include a smart phone, a tablet, a laptop computer, etc. FIGS. 1A-1C illustrate such a user device 114.

In accordance with exemplary aspects of the invention, encryption of communications within the various communication networks (e.g., networks 100, 120, 140, and 200 illustrated in FIGS. 1A-1C and FIG. 2) is provided. For example, in a point-to-point configuration, transmissions between the plurality of local communication devices and the corresponding communication hub are encrypted. Such transmissions (e.g., from the local communication devices to the communication hub) may be encrypted, for example, using an encryption key included at each of the respective local communication devices. Further, such transmissions (e.g., from the communication hub to the local communication devices) may be encrypted using an encryption key included at the communication hub.

Further, communications between the computer server and each of the (i) the plurality of local communication devices, and (ii) the communication hub, may be encrypted.

For example, each account (e.g., each laundromat account) may have a unique key between the account holder and the computer server.

Figure 3:
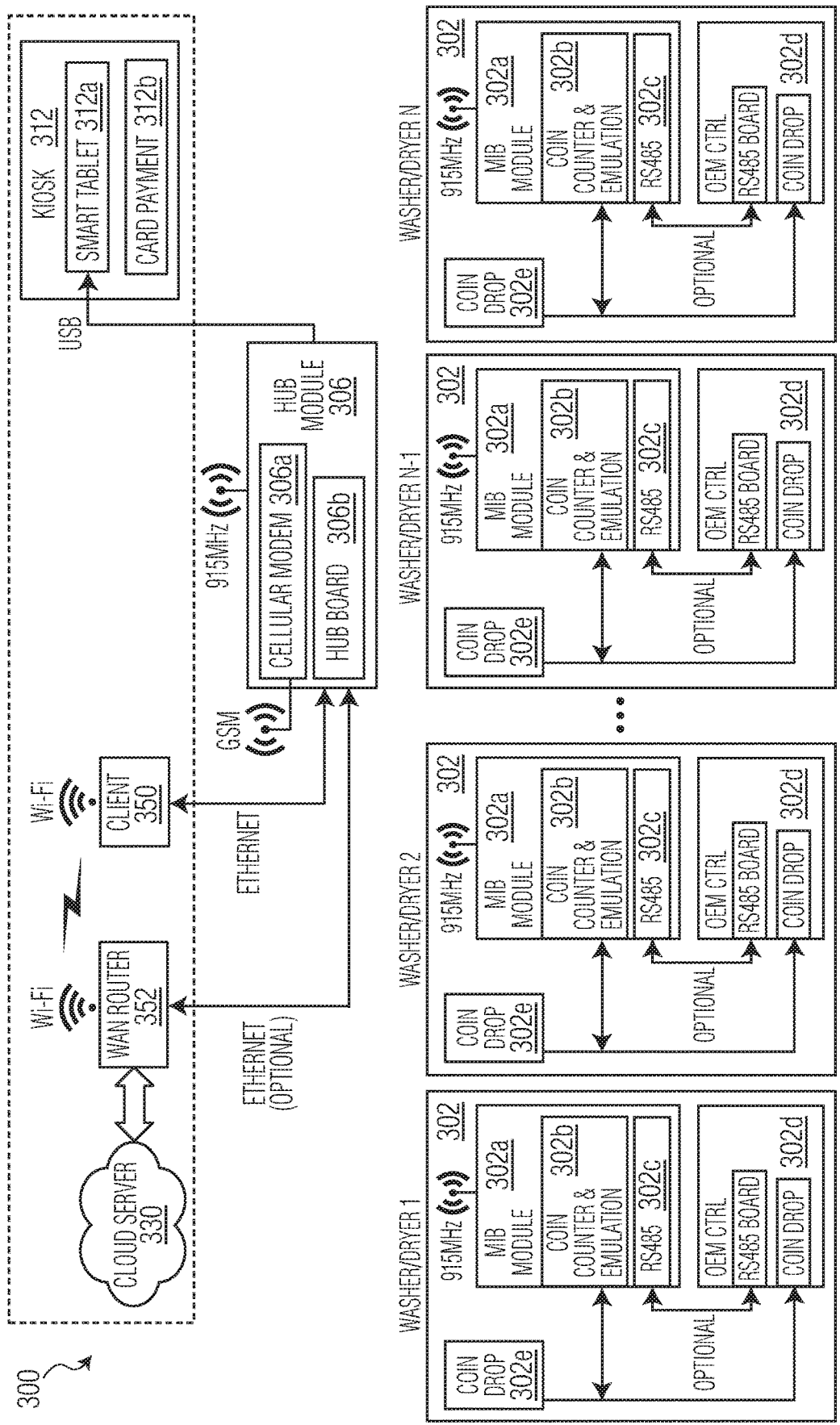
FIG. 3-5 are block diagrams illustrating yet another communication network for appliances in accordance with another exemplary embodiment of the invention.
Figure 4:
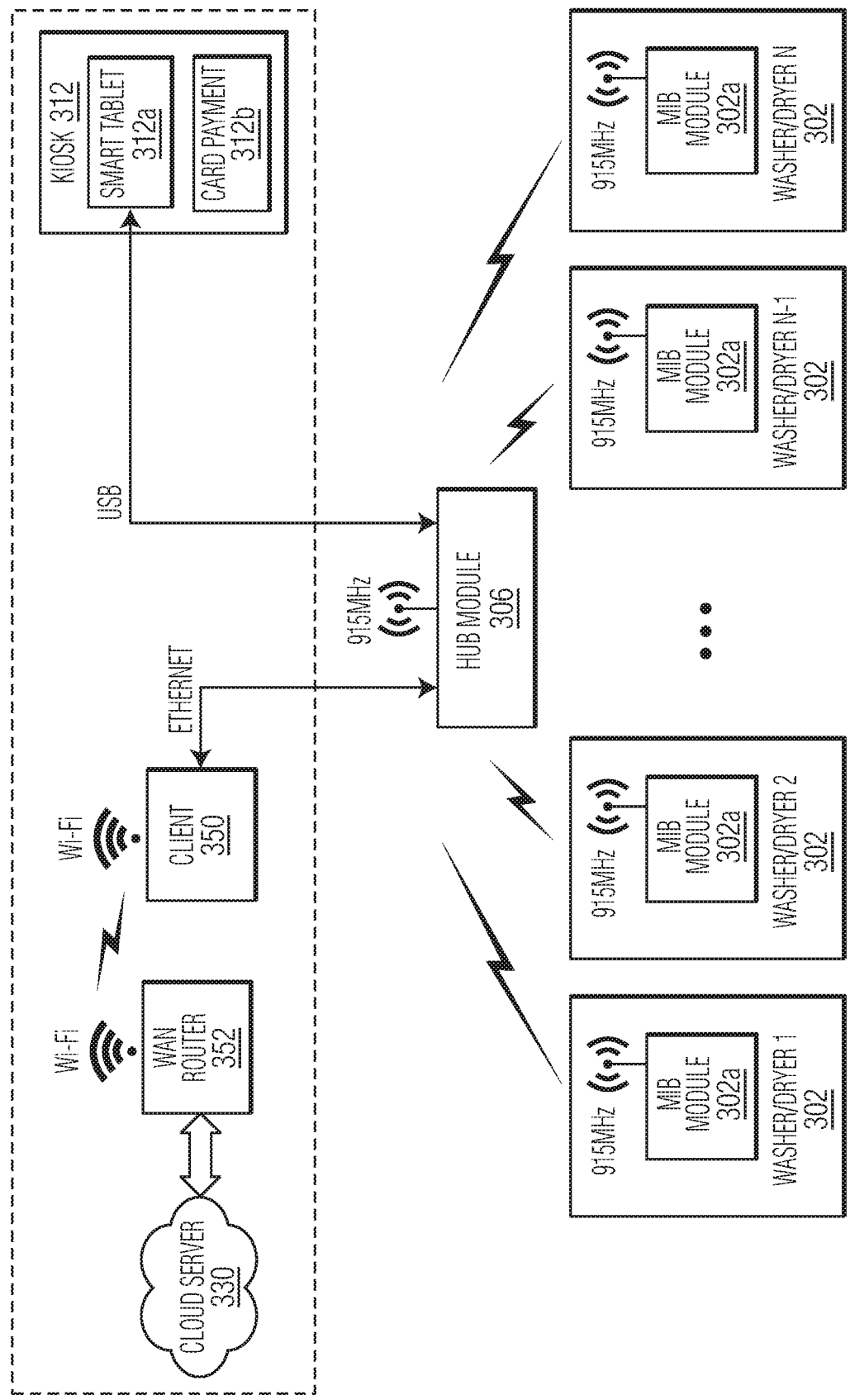
Figure 5:
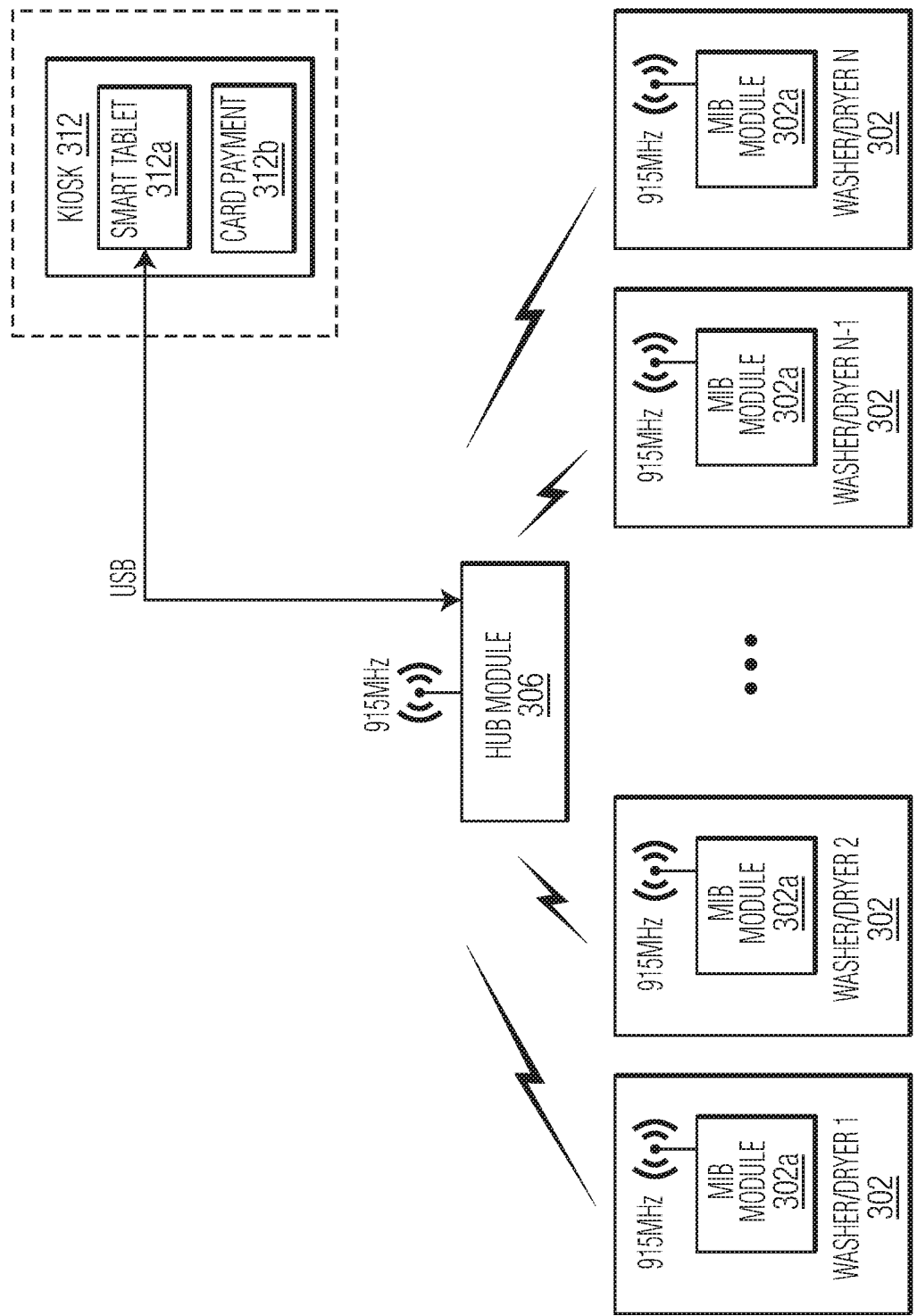

FIGS. 3-5 provide specific examples of aspects of the invention, providing further details as compared to FIGS. 1A-1C and FIG. 2.

Exemplary communication networks according to the invention may include two custom hardware modules, that is: (1) a machine interface board 302a (i.e., a MIB module 302a, sometimes referred to as a MIB); and (2) a machine HUB board 306 (i.e., HUB module 306, sometimes referred to as a HUB). The MIB module 302a corresponds to an example of a local communication device as described above (with respect to FIGS. 1A-1C and FIG. 2), and the HUB module 306 corresponds to an example of a communication hub as described above (with respect to FIGS. 1A-1C and FIG. 2). FIG. 3 illustrates an example system architecture of a communication network 300 including such custom hardware modules.

In FIG. 3, each washer/dryer 302 (which may be, for example, a washing machine, a clothes drying machine, a combination washer/dryer, or another appliance) includes a MIB module 302a, which interacts with an OEM control module 302d of the washer/dryer 302 via, for example, a coin counter/emulator 302b using a wire harness or an optional RS485 serial link 302c. Each washer/dryer also includes a coin drop system 302e. A purpose of MIB module 302a is to enable bidirectional secure wireless communication between each washer/dryer 302 and the HUB module 306. The coin counter/emulator 302b includes: (1) an integrated coin counter for counting inserted coins; and (2) an integrated coin emulator which electronically simulates the coin insertion upon user payment. The coin emulator may be software version dependent, because not all washers/dryers (or other appliances) support an RS485 interface. The link between the coin emulator portion of MIB module 302a and the coin drop portion on the OEM control module 302d may be, for example, a custom-built wire harness.

The exemplary HUB module 306 shown in FIG. 3 connects to a smart tablet 312a (at kiosk 312 in an area, such as a laundromat, an apartment common area, a dormitory common area, etc., where kiosk 312 also includes card payment system 312b) via a USB link, where the end user can securely interact with a cloud server 330 (where cloud server 330 corresponds to the computer servers 110/130/150/210 of FIGS. 1A-1C and FIG. 2). The exemplary HUB module 306 in FIG. 3 includes two ethernet links through hub board 306b, namely: (1) one port connected to a wireless client 350 which communicates with a WAN Router 352 (e.g., by WiFi communication), and (2) the other ethernet port connected directly to WAN router 352. WAN Router 352 forwards the data to the cloud server 330 (e.g., a remote, cloud based, computer server). The example HUB module 306 shown in also includes an integrated cellular modem 306a that may be used for remote configuration of the Wifi Client 350 and on-site remote debug functions.

As referenced above, exemplary embodiments of the invention include two separate levels of encryption: (1) End-To-End Encryption (E2EE); and (2) Local Point-To-Point Encryption (LP2PE). These two levels of encryption ensure that only the end nodes and the server (e.g., the cloud server) can encrypt and read the messages. E2EE encryption may be considered a secure method where the data is encrypted on the sender's system or device and only the recipient is able to decrypt it. It is desirable that no one in between can read it or tamper with the data. LP2PE encyption may be considered a local secure method where the data is encrypted/decrypted between an end point and an intermediate device (e.g., the MIB module and HUB Module).

The End-To-End Encryption (E2EE) may be used to serve the bi-directional cloud server to/from kiosk paths as well as the bi-directional cloud server to/from the MIB modules (see, e.g., FIG. 4, where the elements are the same, or substantially the same, as the elements having like reference numbers from FIG. 3).

The Local Point-To-Point Encryption (LP2PE) includes a wireless link (e.g., operating at a frequency below 1 GHz such as 915 MHz) between HUB module 306 and MIB modules 302a as well as the path from HUB module 306 to smart tablet 312a (see, e.g., FIG. 5, where the elements are the same, or substantially the same, as the elements having like reference numbers from FIG. 3). It is important to note that none of the LP2PE paths involves the cloud server interaction. A purpose of the LP2PE paths is to transmit various local status messages. For example, the encryption method used for the LP2PE may be the Advanced Encryption Standard (AES256).

Figure 6:
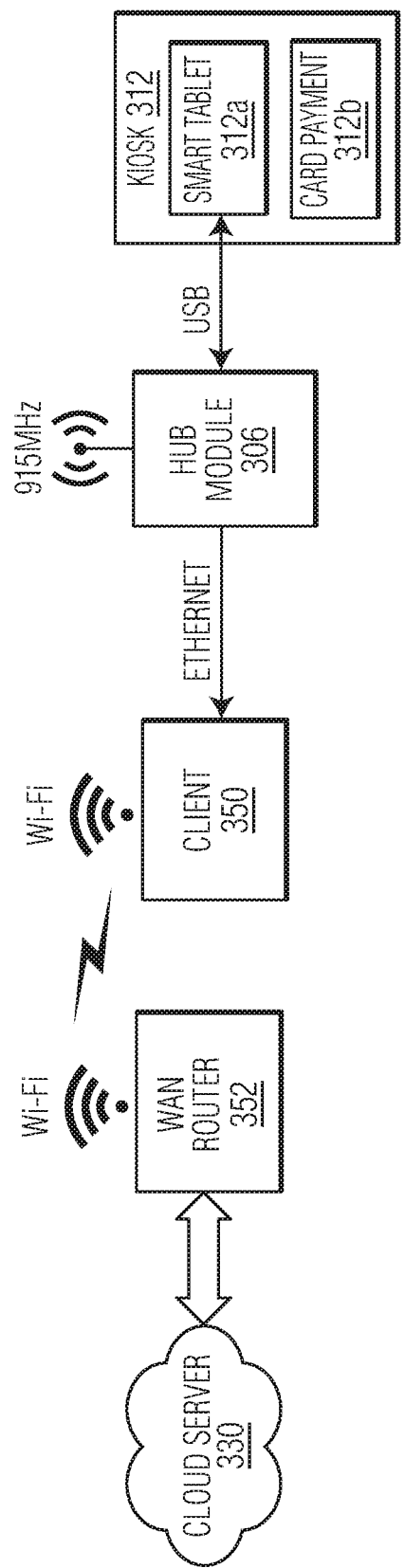
FIGS. 6-8 are block diagrams illustrating example operations of the communication network of FIGS. 3-5 in accordance with an exemplary embodiment of the invention.
Figure 7:
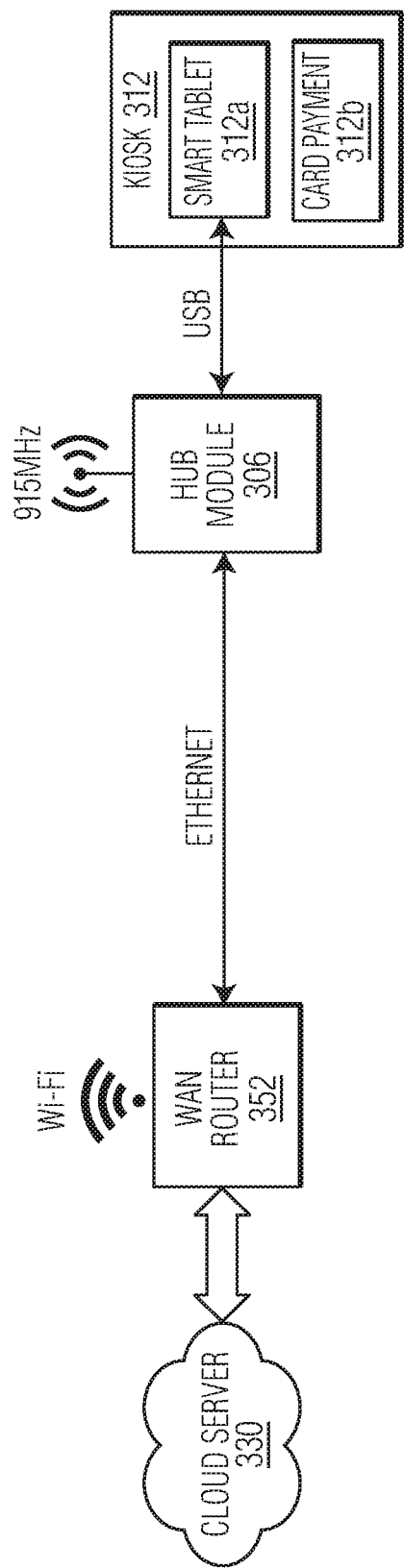

An exemplary operation of the exemplary communication network of FIGS. 3-5 is now provided. When customer makes a payment at kiosk 312 (e.g., via smart tablet 312a, see FIG. 6, where the elements are the same, or substantially the same, as the elements having like reference numbers from FIG. 3), an application generated message (e.g., a payment request) is encrypted with an End-To-End Encryption (E2EE) protocol and sent via a USB link to a nearby HUB module 306. HUB module 306 forwards (e.g., via Ethernet), the message to a Wi-Fi Client 350. Client 350 relays the encrypted message over a Wi-Fi Link to WAN Router 352, where the message is sent to remote Cloud Server 330 for decryption and further processing. Optionally the WAN Router 352 can be connected to HUB module 306 via a dedicated Ethernet link (see FIG. 7, where the elements are the same, or substantially the same, as the elements having like reference numbers from FIG. 3). In this configuration, the Wi-Fi Client 350 is bypassed and may not be used.

Figure 8:
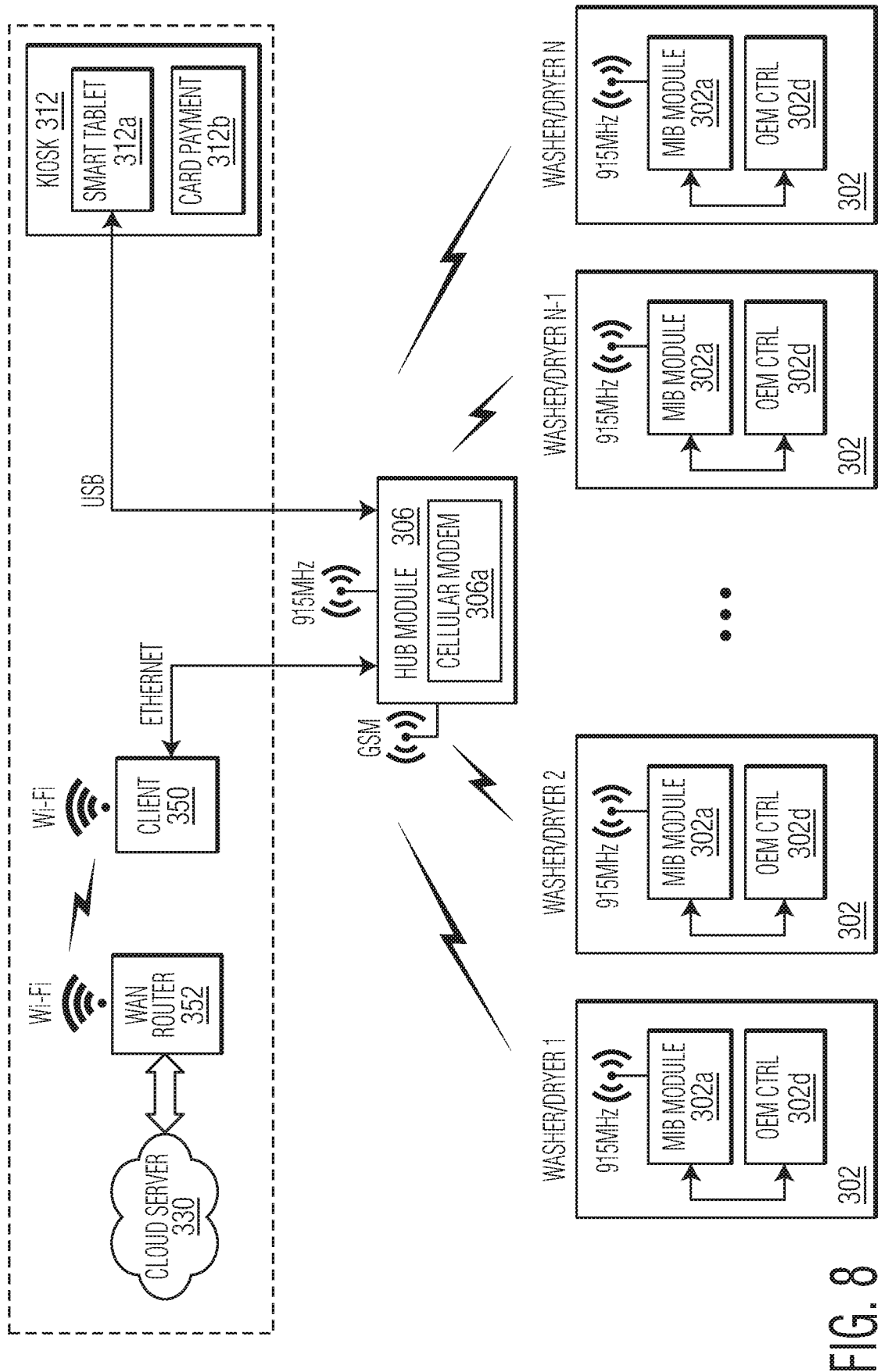

Once the cloud server 330 decrypts and processes the received application message (e.g., a message sent from smart tablet 312a at kiosk 312), any desired server response is encrypted as a server message (e.g., a message sent from cloud server 330), and is sent to HUB module 306 (see FIG. 8, where the elements are the same, or substantially the same, as the elements having like reference numbers from FIG. 3). A server message can be sent wirelessly (e.g., at a frequency below 1 GHz, such as at 915 MHz) from HUB module 306 to the corresponding MIB module 302a at a washer/dryer 302 using the local LP2PE protocol. The MIB module 302a inside the washer/dryer 302 decrypts the message from HUB module 306 and sends a command to a respective OEM control module 302d shown in FIG. 8. OEM control module 302d interprets the command and directly controls operation of washer/dryer 302.

In addition, HUB module 306 may perform a periodic status polling of the operation of the washers/dryers 302 using the local LP2PE protocol and transmits the status messages to cloud server 330 through client 350 and/or WAN router 352. HUB module 306 has an integrated cellular modem 306a that may be used for remote configuration of the Wi-Fi Client 350 and on-site remote debug functions.

Figure 9:
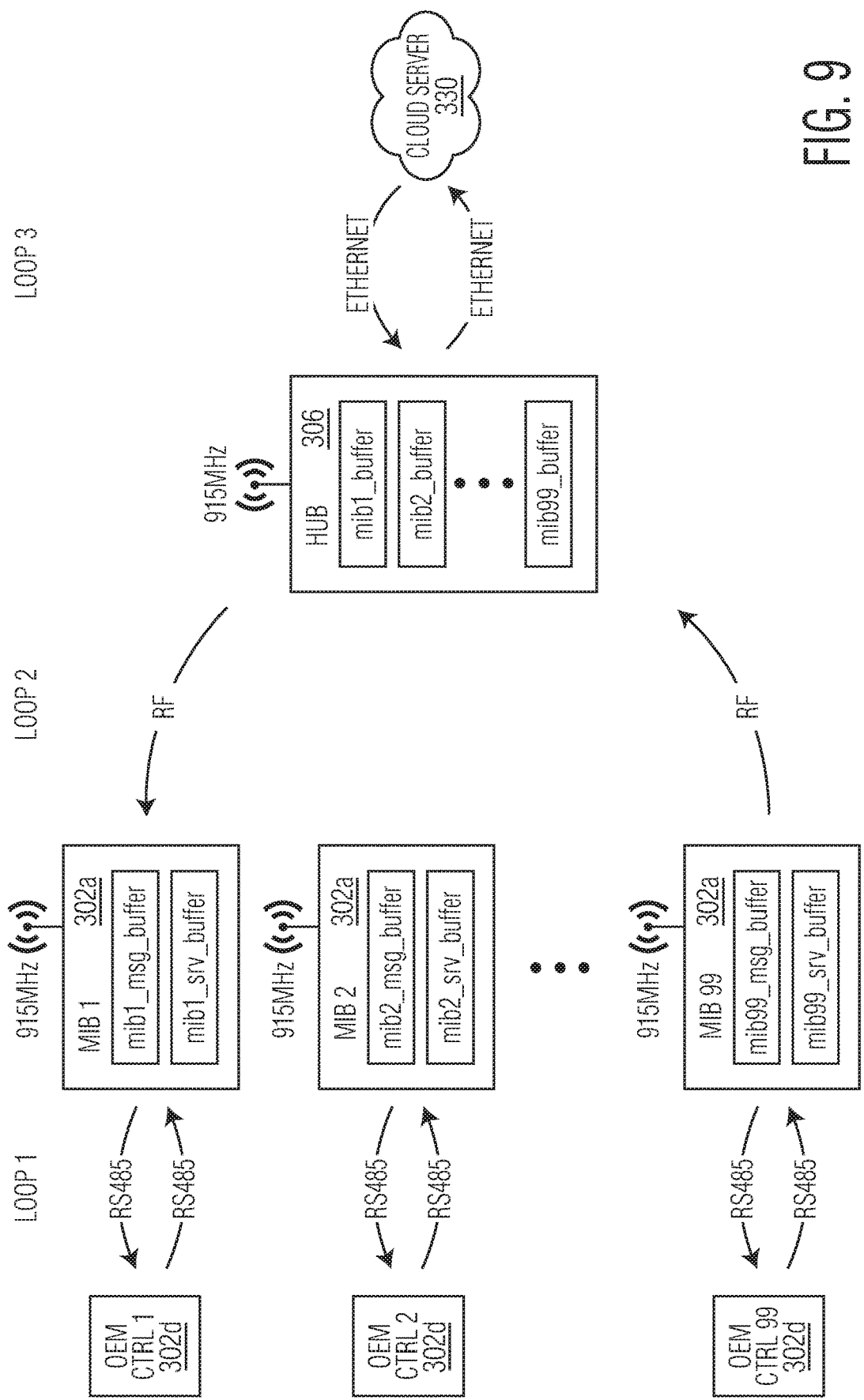
FIG. 9 is a block diagram illustrating example message traffic routing in the communication network of FIGS. 3-5 in accordance with an exemplary embodiment of the invention.

An exemplary traffic/message routing of the exemplary communication network 300 of FIGS. 3-5 is now provided. The example system traffic routing includes three independent message loops (see FIG. 9, where the elements are the same, or substantially the same, as the elements having like reference numbers from FIG. 3). The first message loop is between OEM control boards 302d and MIB modules 302a. In this loop, each MIB module 302a independently polls status messages from respective OEM control board 302d (e.g., via RS-485 link) and stores them into a local message buffer. The second message loop is between HUB module 306 and MIB modules 302a (e.g., MIB 1, MIB 2, MIB 99, in this example up to a maximum of 99 MIBs). In this loop, HUB module 306 periodically (e.g., at a predetermined interval such as every 2 seconds) issues a read request over the air (e.g., at 915 MHz) to all of the available MIB modules 302a and stores all the received status messages into its local buffer. The third message loop is between cloud server 330 and HUB module 306. In this loop, HUB module 306 periodically (e.g., at a predetermined interval such as every 2 seconds) sends its last stored mib_buffer messages via an Ethernet link to cloud server 330.

Once cloud server 330 receives a status update from HUB module 306, it can also send a specific command message request to any of the appliances/machines 302. In this case, HUB module 306, after it has finished its regular polling loop, may push the server request message to all of the MIB modules 302a. Only the appropriate MIB module(s) 302a, after their finished regular polling loop, will push the server message request to its machine. The MIB module 302a will, on its next regular status-polling scan, in addition to message_buffer also store the specific machine response to a server_buffer as well (see FIG. 9). Now, upon a next regular HUB polling request, the MIB module 302a will return the stored server_buffer as well as the regular message_buffer back to HUB module 306.

HUB module 306 can scan and assign a timeslot number to any newly discovered MIB modules 302a (e.g., up to 99 MIB modules 302a per HUB module 306). In this case, HUB module 306 sends a special command, which forces any newly installed MIB modules 302a to respond with their own unique ID number. HUB module 306 then assigns to each new MIB module 302a its own unique slot number and an address, causing them to sync up with the rest of the MIB modules 302a in the communication network 300.

Figure 10:
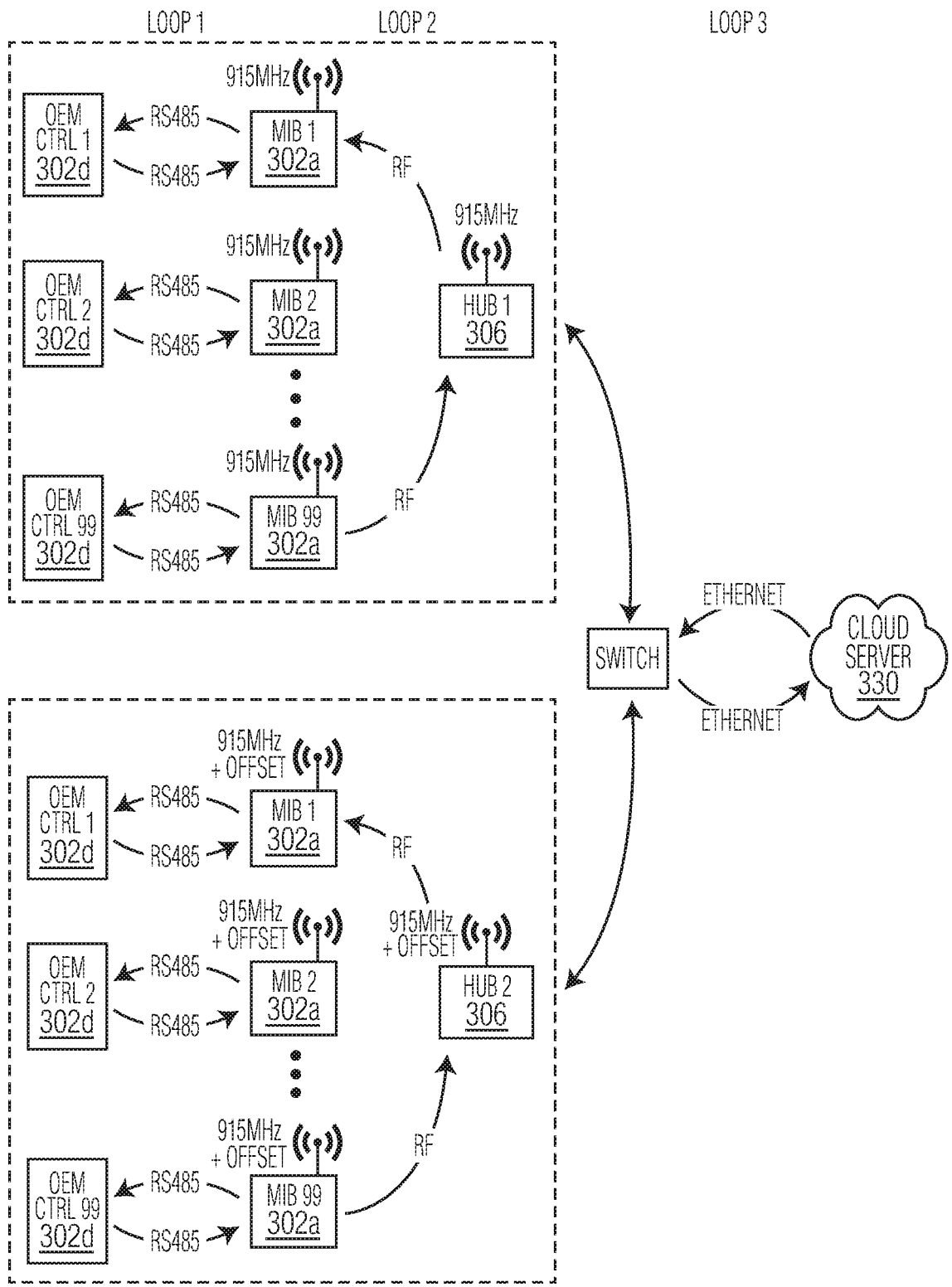
FIG. 10 is a block diagram illustrating example message traffic routing in a multi-HUB configuration in accordance with an exemplary embodiment of the invention.

Communication network 300 of FIGS. 3-5 may also support multi-HUB message routing (such as the configuration of FIG. 2 including multiple communication hubs 206, 216). This configuration is useful when a physical location requires more than a predetermined number of appliances/machines (e.g., 99 machines) to be in operation. If each HUB module 306 can service a set of 99 machines 302, then the next set of 99 machines 302 will be assigned to another HUB module 306, which operates at slightly different frequency than the first HUB module 306. FIG. 10 illustrates an example of a two-HUB network where a total of 198 machines are engaged with cloud server 330. Both HUB modules 306 operate at a frequency below 1 GHz (e.g., one HUB is operating at 915 MHz and the other one is operating at 915 MHz+/−some frequency offset range).

As used herein, the term "user" of an appliance shall be broadly construed to include users who interact with the appliance during installed operation (such as a laundry customer), or another user of the appliance who is not a customer, such as a worker at the appliance manufacturing or service site, or even an automated data collection user, amongst others.

Although the invention has been described primarily with respect to a user utilizing a kiosk (e.g., including a smart tablet) as a user interface to interact with the appliances (through the inventive communication networks) it is not limited thereto. For example, a software application may be installed on a user device (e.g., a smart phone, a tablet, etc.) such that the user can operate the appliances through their own device, without using a kiosk at the facility (e.g., the laundromat, the common area of the apartment complex, the common area of the dormitory, etc.).

Although FIGS. 3-10 illustrate a cloud based server (i.e., cloud server 330), it is understood that other types of computer servers (e.g., non-cloud based computer servers, such as computer server 110 described above in connection with FIG. 1A) are contemplated. Further, although FIGS. 3-10 illustrate user interactions through a kiosk 312, it is understood that a different user device (e.g., a cell phone, a user tablet, etc., such as user device 114 shown in FIGS. 1A-1C) may be employed for such interactions. Further still, although FIGS. 3-8 illustrate a USB connection between kiosk 312 and hub module 306, this connection is exemplary in nature, and other connections are contemplated—and kiosk 312 may also be in direct communication with the server (e.g., server 310) such as is shown FIGS. 1A-1C (where kiosk 112 includes a direct, dotted line connection, to computer server 110/130/150).

Further still, although FIGS. 3-10 illustrate various exemplary communication technologies (e.g., RS485, 915 MHz, ethernet, GSM, Wi-Fi, USB, etc.), these technologies are exemplary in nature, and alternative technologies are contemplated for each of the illustrated functions. Further still, while various of the communications are shown as 915 MHz radio frequency transmissions, it is understood that this is an exemplary frequency, and that different frequencies (e.g., any frequency below 1 GHz) are contemplated.

Although the computers illustrated in the drawings are referred to as "server" computers (e.g., computer server 110, cloud based computer server 130, cloud based computer server 150, cloud server 330), it is understood that any type of computer may be considered to be within the definition of a "server", as desired given the requirements of the specific application.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A communication network for appliances, the communication network comprising:
   (a) a plurality of local communication devices, each of the plurality of local communication devices transmitting data related to each of (i) a user of an appliance, and (ii) the appliance; and
   (b) a communication hub receiving data transmissions from each of the plurality of local communication devices,
   wherein communications between the plurality of local communication devices and the communication hub are bidirectional communications and are encrypted,
   wherein the appliances are laundry appliances configured to be installed in a laundry area, and wherein each of the plurality of local communication devices and the communication hub are configured to be located in the laundry area.

2. The communication network of claim 1 wherein transmissions from each of the plurality of local communication devices is encrypted using an encryption key included at each of the respective local communication devices.

3. The communication network of claim 1 wherein transmissions from the communication hub to any of the plurality of local communication devices is encrypted using an encryption key included at the communication hub.

4. The communication network of claim 1 further comprising a computer configured to communicate with the communication hub, and configured to retrieve data related to at least one of (i) the user of the appliance, and (ii) the appliance.

5. The communication network of claim 4 wherein the computer is connected to the communication hub via the Internet.

6. The communication network of claim 4 wherein the computer is connected to the communication hub via a plurality of distinct Internet connections.

7. The communication network of claim 1 wherein communication between the plurality of local communication devices and the communication hub are radio frequency transmissions that are below 1 GHz.

8. The communication network of claim 1 wherein communication between the plurality of local communication devices and the communication hub are radio frequency transmissions at a frequency of 900 MHz.

9. The communication network of claim 4 wherein communications between the computer and each of the (i) the plurality of local communication mun devices, and (ii) the communication hub, are encrypted.

10. The communication network of claim 1 further comprising a kiosk for use by a user of at least one of the appliances, the kiosk being in wireless communication with the communication hub.

11. The communication network of claim 10 wherein the kiosk is configured to be located in the laundry area.

12. The communication network of claim 1 wherein the data related to the user of the appliance includes at least one of (i) information identifying the user, (ii) an account identifier of the user, (iii) instructions from the user for operation of the appliance, and (iv) an account balance of the user.

13. The communication network of claim 1 wherein the data related to the appliance includes at least one of (i) information identifying the appliance, (ii) an operational status of the appliance, (iii) instructions from the user for operation of the appliance, and (iv) an alarm condition of the appliance.

14. A method of operating a communication network for appliances, the method comprising the steps of:
(a) providing a plurality of local communication devices, each of the plurality of local communication devices being attached to a corresponding one of a plurality of appliances;
(b) transmitting data bidirectionally between each of the plurality of local communication devices and a communication hub, the data being transmitted from each of the plurality of local communication devices being related to each of (i) a user of at least one of the plurality of appliances, and (ii) at least one of the plurality of appliances,
wherein step (b) includes encrypting communications between the plurality of local communication devices and the communication hub prior to transmission,
wherein the appliances are laundry appliances configured to be installed in a laundry area, and wherein each of the plurality of local communication devices and the communication hub are configured to be located in the laundry area.

15. The method of claim 14 wherein transmissions from each of the plurality of local communication devices are encrypted using an encryption key included at each of the respective local communication devices.

16. The method of claim 14 wherein transmissions from the communication hub to any of the plurality of local communication devices are encrypted using an encryption key included at the communication hub.

17. A communication network for appliances, the communication network comprising:
(a) a plurality of local communication devices, each of the plurality of local communication devices transmitting data related to each of (i) a user of an appliance, and (ii) the appliance;
(b) a communication hub receiving data transmissions from each of the plurality of local communication devices; and
(c) a computer configured to communicate with the communication hub, and configured to retrieve data related to at least one of (i) the user of the appliance, and (ii) the appliance,
wherein communications between the computer and each of the (i) the plurality of local communication devices, and (ii) the communication hub, are bidirectional communications and are encrypted,
wherein the appliances are laundry appliances configured to be installed in a laundry area, and wherein each of the plurality of local communication devices, the communication hub, and the computer are configured to be located in the laundry area.

18. The communication network of claim 17 wherein communications between the plurality of local communication devices and the communication hub are encrypted.

19. The communication network of claim 17 wherein transmissions from each of the plurality of local communication devices to the communication hub are encrypted using an encryption key included at each of the respective local communication devices.

20. The communication network of claim 17 wherein transmissions from the communication hub to any of the plurality of local communication devices are encrypted using an encryption key included at the communication hub.

21. The communication network of claim 17 wherein the computer is connected to the communication hub via the Internet.

22. The communication network of claim 17 wherein the computer is connected to the communication hub via a plurality of distinct Internet connections.

23. The communication network of claim 17 wherein communication between the plurality of local communication devices and the communication hub are radio frequency transmissions that are below 1 GHz.

24. The communication network of claim 17 wherein communication between the plurality of local communication devices and the hub are radio frequency transmissions at a frequency of 900 MHz.

25. The communication network of claim 17 further comprising a kiosk for use by a user of at least one of the appliances, the kiosk being in wireless communication with the communication hub.

26. The communication network of claim 25 wherein the kiosk is configured to be located in the laundry area.

27. The communication network of claim 17 wherein the data related to the user of the appliance includes at least one of (i) information identifying the user, (ii) an account identifier of the user, (iii) instructions from the user for operation of the appliance, and (iv) an account balance of the user.

28. The communication network of claim 17 wherein the data related to the appliance includes at least one of (i) information identifying the appliance, (ii) an operational status of the appliance, (iii) instructions from the user for operation of the appliance, and (iv) an alarm condition of the appliance.

29. A method of operating a communication network for appliances, the method comprising the steps of:
   (a) providing a plurality of local communication devices, each of the plurality of local communication devices being attached to a corresponding one of a plurality of appliances;
   (b) transmitting data bidirectionally between each of the plurality of local communication devices and a communication hub, the data being transmitted from each of the plurality of local communication devices being related to each of (i) a user of at least one of the plurality of appliances, and (ii) at least one of the plurality of appliances; and
   (c) transmitting data between the communication hub and a computer, the data being transmitted between the communication hub and the computer being related to at least one of (i) a user of at least one of the plurality of appliances, and (ii) at least one of the plurality of appliances, wherein step (c) includes encrypting communications between the communication hub and the computer prior to transmission, wherein the appliances are laundry appliances configured to be installed in a laundry area, and wherein each of the plurality of local communication devices and the communication hub are configured to be located in the laundry area.

\* \* \* \* \*